(12) United States Patent
Bergeron et al.

(10) Patent No.: US 8,332,758 B2
(45) Date of Patent: Dec. 11, 2012

(54) PLUGIN-BASED USER INTERFACE CONTRIBUTIONS TO MANAGE POLICIES IN AN IT ENVIRONMENT

(75) Inventors: John Bergeron, Cedar Park, TX (US); Jonathan S. Kung, Austin, TX (US); Sridhar R. Muppidi, Austin, TX (US); Borna Safabakhsh, Mountain View, CA (US); Eric J. Wood, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 12/626,005

(22) Filed: Nov. 25, 2009

(65) Prior Publication Data

US 2011/0126118 A1    May 26, 2011

(51) Int. Cl.
*G06F 3/00* (2006.01)
(52) U.S. Cl. .................... 715/743; 715/742; 715/744
(58) Field of Classification Search .............. 715/743, 715/744, 742
See application file for complete search history.

(56) References Cited

U.S. PATENT DOCUMENTS

| | | | |
|---|---|---|---|
| 7,065,744 B2 * | 6/2006 | Barker et al. | 717/109 |
| 7,412,490 B2 | 8/2008 | Matsa et al. | |
| 7,472,422 B1 | 12/2008 | Agbabian | |
| 7,512,965 B1 | 3/2009 | Amdur et al. | |
| 2003/0135360 A1 * | 7/2003 | Barker et al. | 704/8 |
| 2003/0167320 A1 * | 9/2003 | Perez | 709/223 |
| 2005/0188295 A1 * | 8/2005 | Konkus et al. | 715/500 |
| 2006/0200803 A1 | 9/2006 | Neumann et al. | |
| 2007/0101435 A1 | 5/2007 | Konanka et al. | |
| 2009/0177646 A1 * | 7/2009 | Pham et al. | 707/5 |
| 2009/0187648 A1 * | 7/2009 | Sunkammurali et al. | 709/223 |

OTHER PUBLICATIONS

Cooper-et al.; "Dynamic Pluggable User Interface Layout"; Dialog/CSA; 2008.
Beaumont-Gay-et al.; "Information Protection via Environmental Data Tethers"; ACM Digital Library; pp. 67-77, Sep. 2007.
Kamara-et al.; "An Extensible Platform for Evaluating Security Protocols"; ACM Digital Library/IEEE; 2005.

* cited by examiner

*Primary Examiner* — Omar Abdul-Ali
(74) *Attorney, Agent, or Firm* — Brevetto Law Group

(57) ABSTRACT

An approach is provided that registers a component plug-in with a console application. A request is received from a user of the console application. The console application displays a console user interface in a predetermined interface style. The console application detects that the request corresponds to the component plug-in and sends an initial request to the component plug-in. The console application receives an initial model of an initial user interface from the component plug-in and this model is provided to the user in response to the initial request. The console application builds an initial component user interface based on the received initial model. The initial component user interface is also consistent with the predetermined interface style. The console application displays the initial component user interface and the console user interface in a common application window in the predetermined interface style.

20 Claims, 6 Drawing Sheets

PLUGIN-BASED USER INTERFACE CONTRIBUTIONS TO MANAGE POLICIES IN AN IT ENVIRONMENT

TECHNICAL FIELD

The approach presented relates to an approach that uses a plug-ins to manage organizational policies. More particularly, the approach presented provides a consistent look-and-feel for components that plug into a console application.

BACKGROUND

When managing operational policy for an information technology (IT), many different types of policies can be managed. These policies might include authorization policies, message protection policies, and the like. In addition, a customer may use a variety of software products with many or all of the software products providing different policies. Different products may have different end-user interfaces.

SUMMARY

An approach is provided that registers a component plug-in with a console application. A request is received from a user of the console application. The console application displays a console user interface in a predetermined interface style. The console application detects that the request corresponds to the component plug-in and sends an initial request to the component plug-in. The console application receives an initial model of an initial user interface from the component plug-in and this model is provided to the user in response to the initial request. The console application builds an initial component user interface based on the received initial model. The initial component user interface is also consistent with the predetermined interface style. The console application displays the initial component user interface and the console user interface in a common application window so that both the initial component user interface and the console user interface are displayed in the predetermined interface style.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
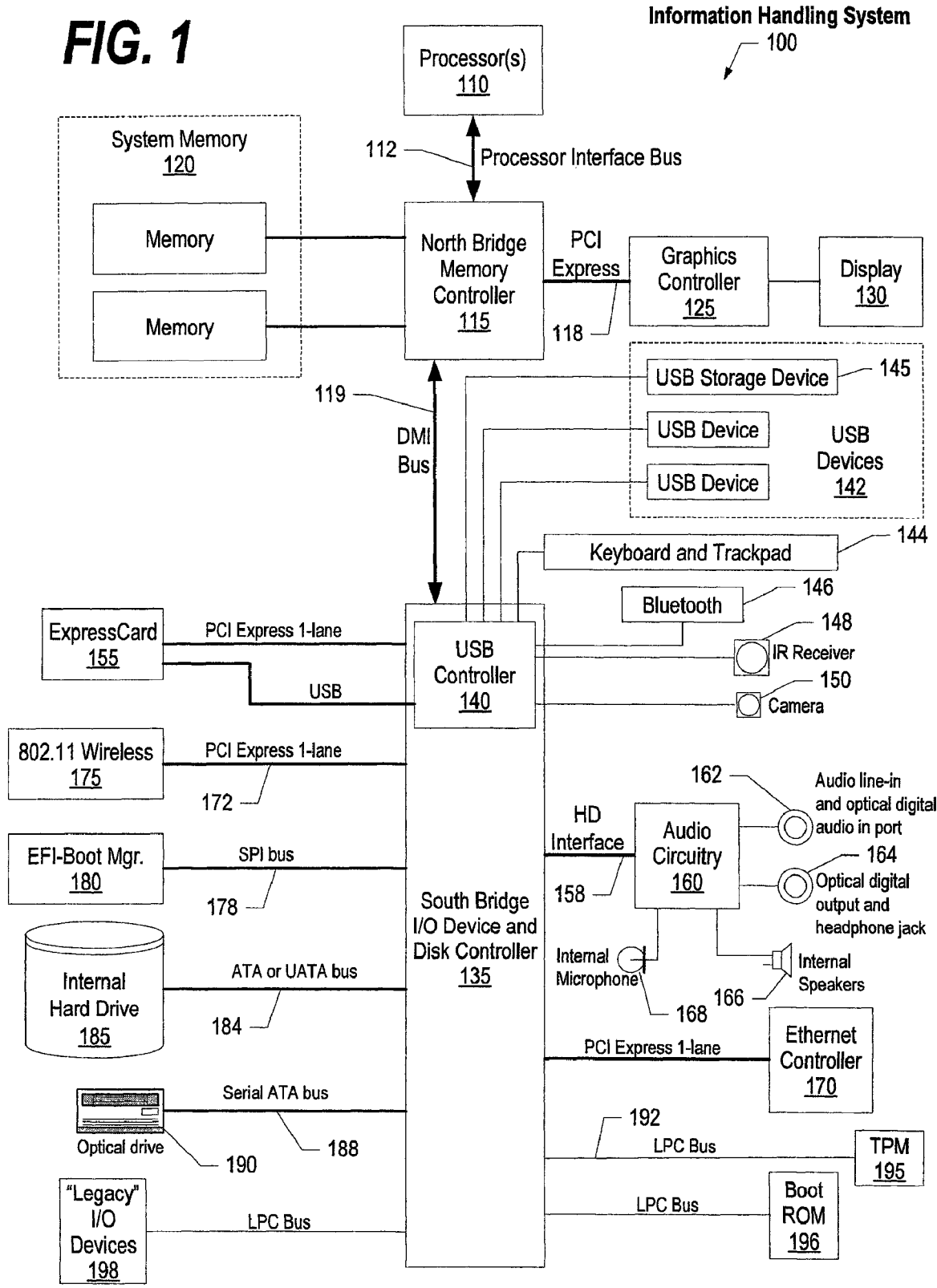
FIG. 1 is a block diagram of a data processing system in which the methods described herein can be implemented.
Figure 2:
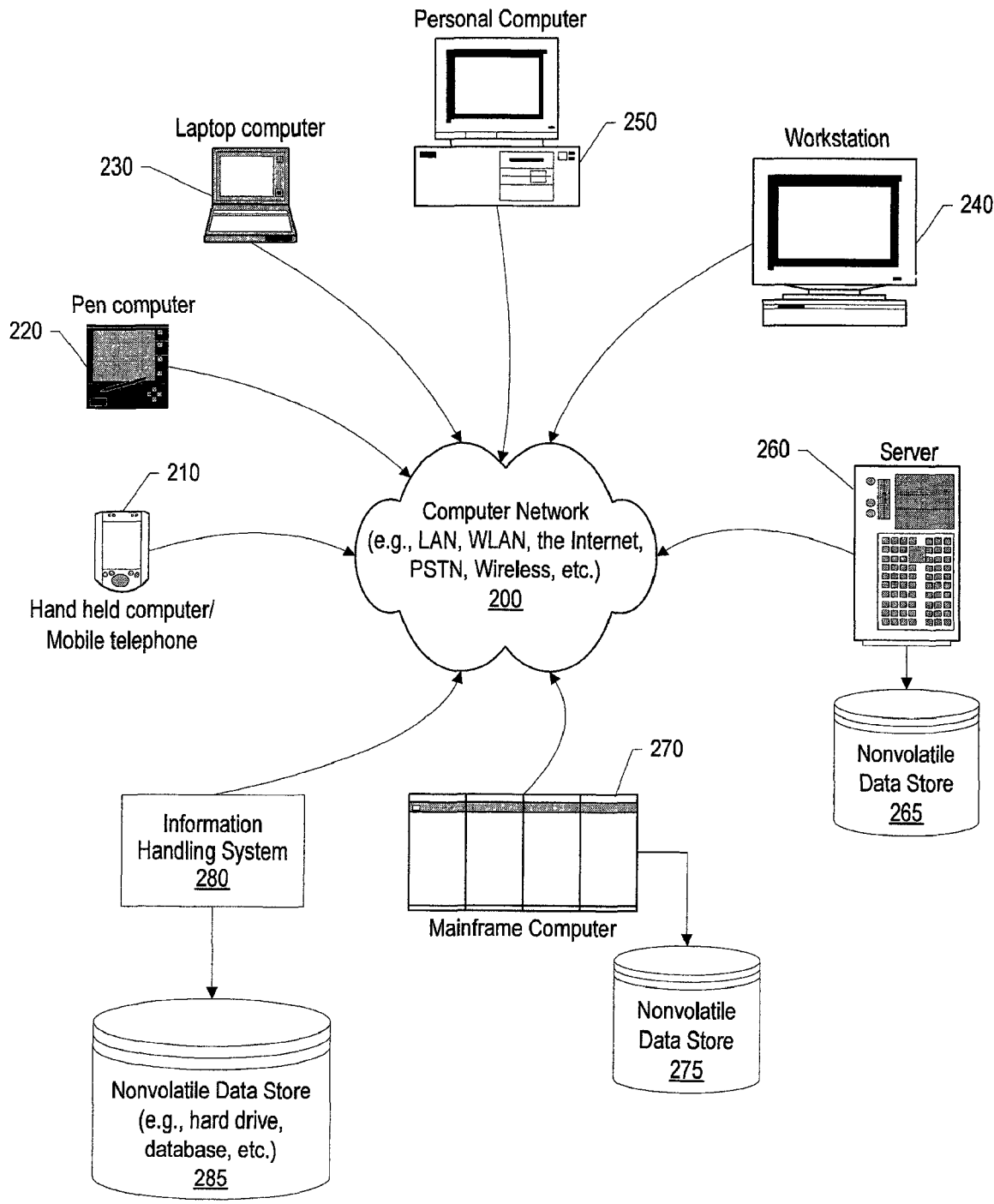
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, mobile internet device, or other form factor computer or data processing system. In addition, an information handling system may take other form factors such as a personal digital assistant (PDA), a gaming device, ATM machine, a portable telephone device, a communication device or other devices that include a processor and memory.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/ mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
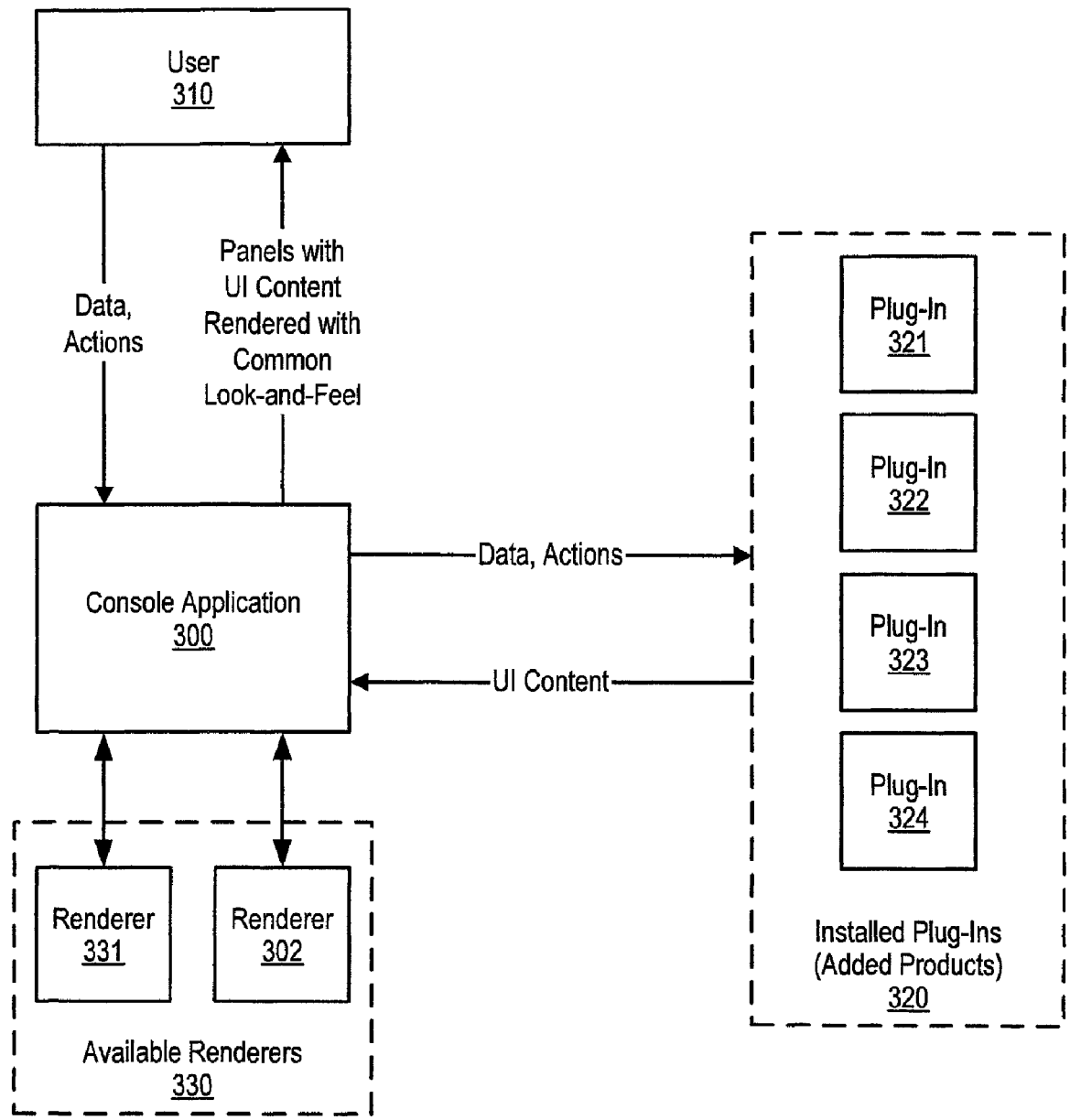
FIG. 3 is a diagram showing the interaction between a console, one or more plug-ins, and the user.

FIG. 3 is a diagram showing the interaction between a console, one or more plug-ins, and the user. Console 300 is a software application. The console is generally a component of an operating system that provides system administrators and other users with an interface through which they can configure and monitor a computer system. Examples of commercially available management consoles include the Tivoli Management Console™ (TMC), the Microsoft Management Console™ (MMC) and the Linux Management Console (LMC). In one embodiment, the console application is the management console itself, while in an alternative embodiment, the console application is an application that runs on top of the management console. In the alternative embodiment, one or more versions of the console application can be written to run on more than one brand of management console (e.g., run on TMC, MMC, and/or LMC).

Additional functionality, such as functionality to manage policies in an IT environment, are provided by component plug-ins 320 (component plug-ins 321, 322, 323, and 324). The component plug-ins are registered with console application 300. The console application provides a consistent "look and feel" or "style" to the user irregardless of the particular component plug-in requested by the user. User 310 is using console application 300 and selects a function, such as a function to manage policies, from console application 300. In one embodiment, the functions are presented, e.g., in a list, to the user in a fashion so that the user does not know whether the console application or an installed component plug-in is providing the function. In response to receiving the user's request, the console application sends a request, such as an initial request, to the particular component plug-in that is responsible for handling the user's request (e.g., the component plug-in that manages particular policies in the IT environment, etc.). The component plug-in responds by providing the console application with a model of the user interface being requested (e.g., a model of an initial user interface for the plug-in, a model of a subsequent user interface for the plug-in, etc.). The console application builds a component user interface based on the model provided by the component plug-in. The component user interface that is built by the console application is built in the same style that is used to present the console application. To accomplish this, the console application creates user interface components using a common renderer that is also used to render the console application. These created user interface components are then inserted into the console user interface so that the style, or "look and feel" of both the interface components of the console application and the component plug-in are the same.

Once the created interface components are displayed to the user, the user works with the interface components (e.g., GUI controls such as text boxes, list and combo pulldown boxes, radio buttons, check boxes, etc.). Console application 300 receives the values corresponding to the interface component input fields (e.g., the values entered into the text boxes, the selections made in list and combo pulldown boxes, etc.). The console application returns the values supplied by the user to the component plug-in. The component plug-in is a software application that processes the inputs (values) provided by the user and, based on those values, either determines that processing is "finished" or that an additional user interface should be presented to the user. If an additional user interface is presented to the user, the component plug-in sends a subsequent model to the console application and the console application builds the subsequent component user interface components as described above, inserts the subsequent component user interface components in the console user interface, and more values are received from the user. This back-and-forth continues until processing by the component plug-in is complete, at which point the component plug in informs the console application that processing is "finished" and the console application can then remove component user interface components from the console user interface.

In one embodiment, multiple rendering functions (available renderers 330 showing two renderers—renderer 331 and 332) are available. In this embodiment, a renderer can be selected and the selected renderer is used to render user interface components on the display. The same renderer (e.g., renderer 331 or 332) is used to render both the console application user interface components and the component plug-in user interface components.

Figure 4:
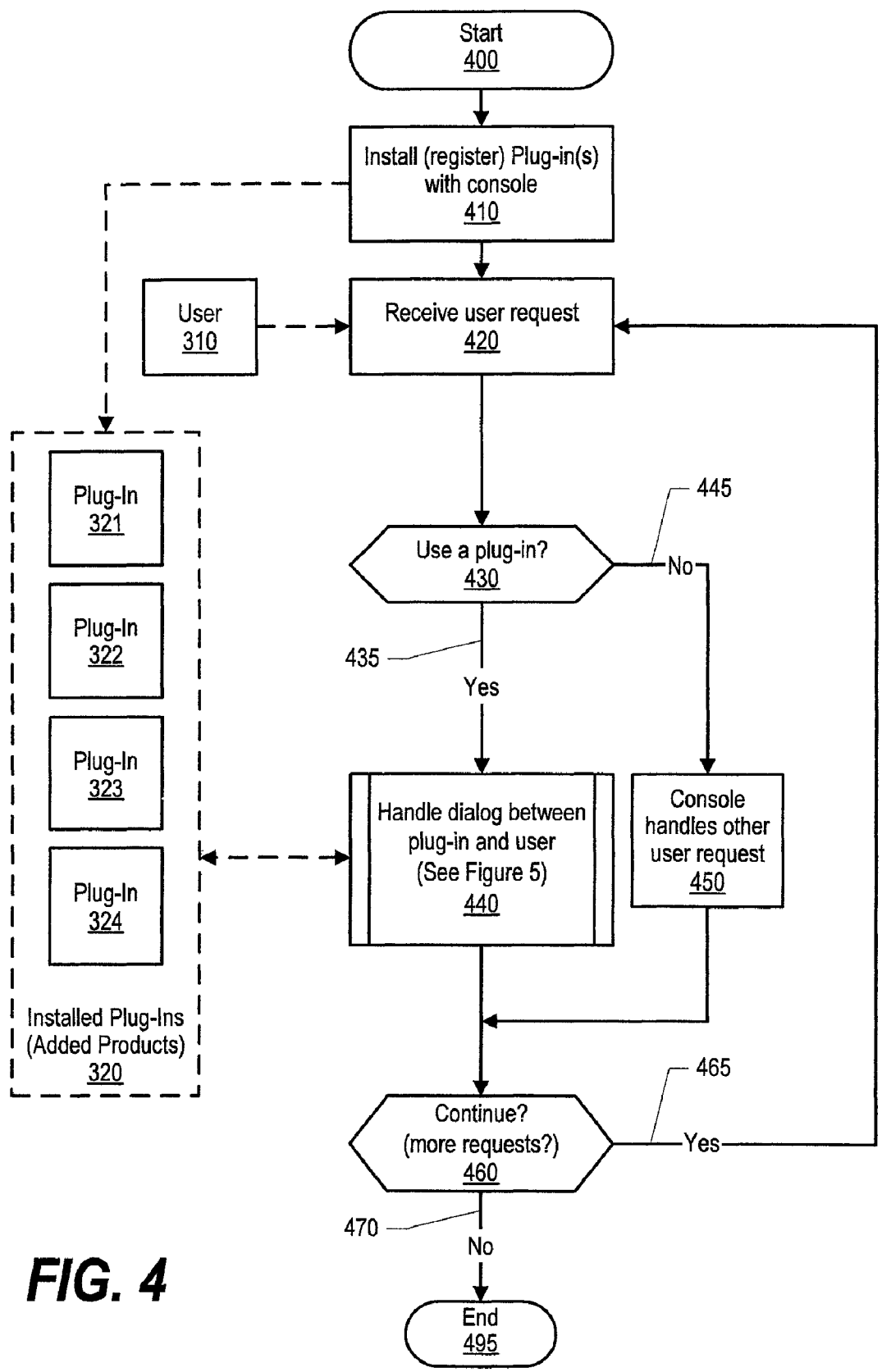
FIG. 4 is a flowchart showing steps taken in the interaction between the user and the console that utilizes plug-ins.

FIG. 4 is a flowchart showing steps taken in the interaction between the user and the console that utilizes plug-ins. Processing commences at 400 whereupon, at step 410, one or more component plug-ins 320 are registered with the console application. In the example shown, four component plug-ins have been registered (plug-ins 321, 322, 323, and 324). At step 420, a request is received from user 310. A determination is made as to whether the request received from the user is requesting functionality provided by a registered plug-in 320. If the requested functionality is provided by a registered plug-in, then decision 430 branches to "yes" branch 435 whereupon, at predefined process 440, dialog between the user and the plug-in is handled by the console application (see FIG. 5 and corresponding text for processing details). On the other hand, if the function requested by the user is not handled by a plug-in, then decision 430 branches to "no" branch 445 whereupon, at step 450, the console application handles the user request without use of one of the registered plug-ins.

A determination is made as to whether the user wishes to continue use of the console application (decision 460). If the user makes additional requests, then decision 460 branches to "yes" branch 465 which loops back to receive and process the next user request. This looping continues until the user does not wish to make additional requests (e.g., exits the console application, etc.), at which point decision 460 branches to "no" branch 470 and processing ends at 495.

Figure 5:
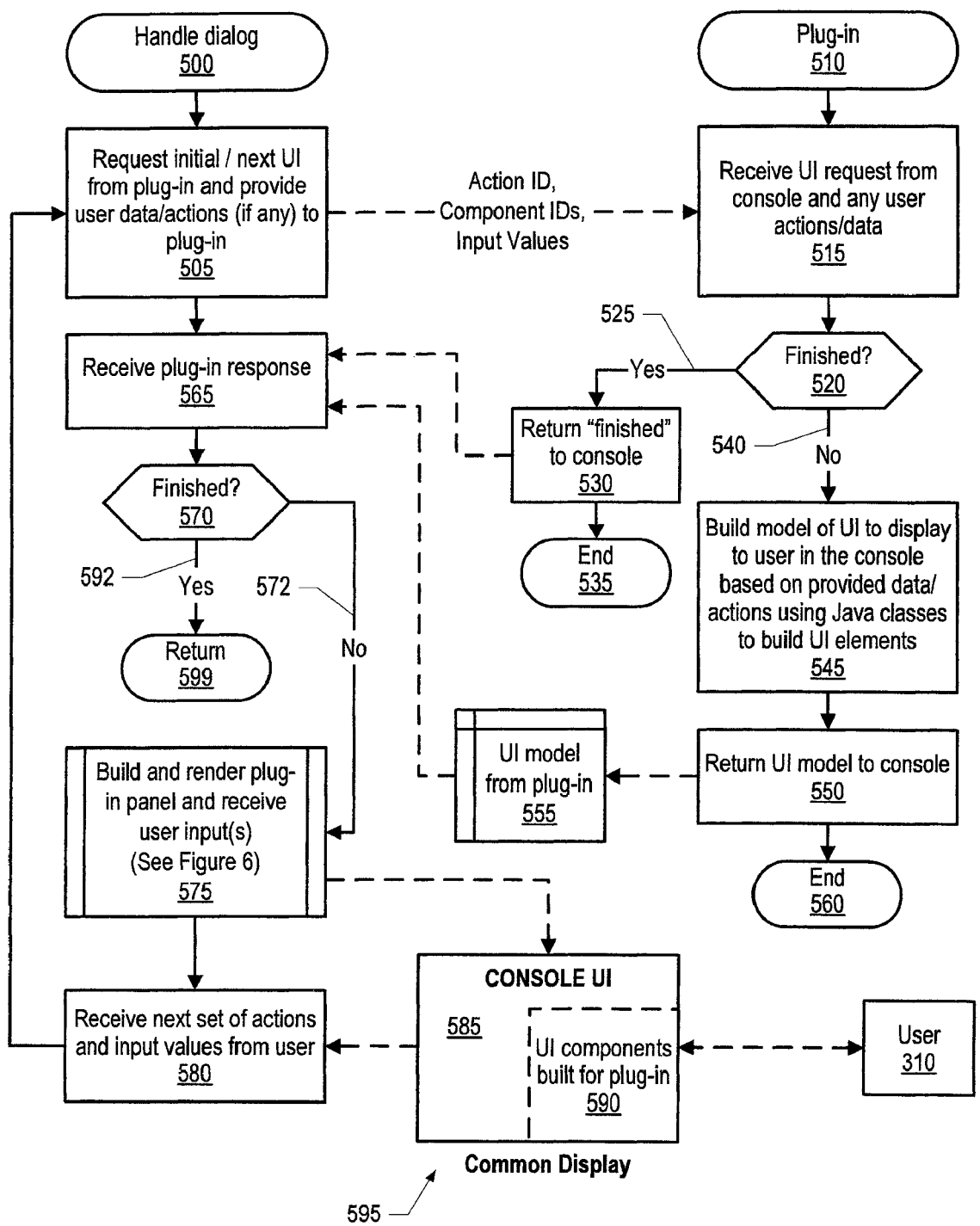
FIG. 5 is a flowchart showing steps taken in handling a dialog between the user and a requested component that provides a look-and-feel based on a renderer.

FIG. 5 is a flowchart showing steps taken in handling a dialog between the user and a requested component that provides a look-and-feel based on a renderer. This processing is called by predefined process 440 shown in FIG. 4. FIG. 5 processing commences at 500 whereupon, at step 505, a request is sent to the registered plug-in that corresponds to the user request. An initial request (with any number of initial values) is first made to the plug-in and one or more subsequent requests can be made to the plug-in based upon the user's response(s) to the interface components made available by the UI model provided by the plug-in.

Plug-in processing is shown commencing at 510 whereupon, at step 515, the plug-in receives values from the console application. The values sent to the plug-in from the console application may include one or more action identifiers, one or more component identifiers, and one or more input values (e.g., the user's input in a text box, etc.). The plug-in application analyzes the received values and determines whether processing by the plug-in is finished (decision 520, e.g., the user pressed a "cancel" command button or finished processing the functionality provided by the plug-in, etc.). If processing by the plug-in is finished, then decision 520 branches to "yes" branch 525 whereupon, at step 530, a "finished" response is returned to the console application and plug-in processing ends at 535. On the other hand, if processing by the plug-in is not finished, then decision 520 branches to "no" branch 540 whereupon, at step 545, the plug-in builds a model of the user interface that should be displayed to the user by the console application, with the model being built based upon the values received in step 515 from the console application. In one embodiment, the component plug-in uses Java classes that are known to the console application in order to build the model of the user interface components. The model determines what user interface components are to be displayed to the user but does not provide stylistic or rendering characteristics as the "look and feel" (style) is provided by the console application. At step 550, the component plug-in returns the model (model 555) of the user interface back to the console application. Plug-in processing then ends at 560.

Returning to processing performed by the console application, the console application receives the response from the plug-in at step 565 (either a model of a user interface to present to the user or a "finished" response). A determination is made as to whether the response from the component plug-in is that plug-in processing is "finished" (decision 570). If processing is not finished (a model of a user interface was received), then decision 570 branches to "no" branch 572 whereupon, at predefined process 575, a component user interface is built by the console application using the received user interface model and this built component user interface is displayed to the user (see FIG. 6 and corresponding text for processing details). Console user interface 585 shows an interface with the console user interface and plug-in user interface components 590 being presented to user 310 in common display 595 where the plug-in user interface components have been inserted into the console application user interface. User 310 responds to the displayed console user interface with the included (inserted) plug-in user interface components by selecting GUI controls on the display, entering values (e.g., into text boxes, etc.). At step 580, the console application receives the next set of values from the user and loops back to send the received values to the component plug-in. This looping continues until use of the plug-in is finished, at which point decision 570 branches to "yes" branch 592 and console application processing returns to the calling routine (see FIG. 4) at 599.

Figure 6:
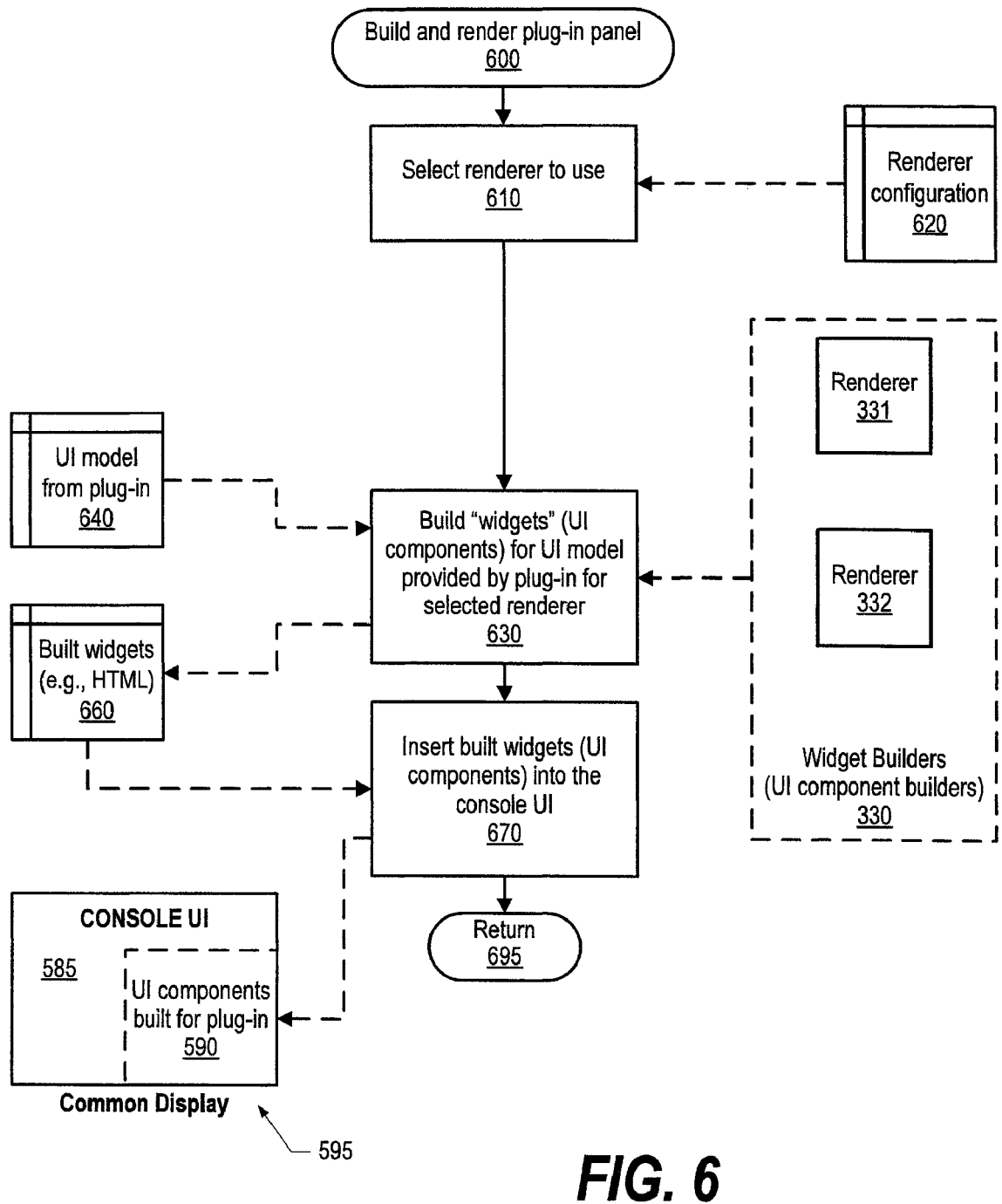
FIG. 6 is a flowchart showing steps taken in building and rendering plug-in panels with a consistent look-and-feel and receiving user input to such panels.

FIG. 6 is a flowchart showing steps taken in building and rendering plug-in panels with a consistent look-and-feel and receiving user input to such panels. This routine is called by predefined process 575 shown in FIG. 5. FIG. 6 processing commences at 600 whereupon, in one embodiment, at step 610, the process selects a renderer to use from renderer configuration 620. One example of a renderer is an open source JavaScript toolkit called "Dojo" that is a tool for rendering dynamic user interfaces. Other commercial and proprietary renderers are also available.

At step 630, the console application builds the plug-in user interface components for the user interface model that was provided by the plug-in (640) for the renderer selected at step 610 (e.g., renderer 331 or 332 selected from available renderers 330). Processing by step 630 results in one or more "widgets" 660 which are user interface components that correspond to the user interface model provided by the component plug-in. In one embodiment, the user interface components are built using hypertext markup language (HTML).

At step 670, the user interface components 650 are inserted into console user interface 585 resulting in common display 595 that includes both console user interface components as well as built plug-in user interface components 590. Processing then returns to the calling routine (FIG. 5) at 695.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system, the method comprising:
   registering a component plug-in with a console application;
   receiving, from a user of the console application, a request, wherein the console application displays a console user interface in a predetermined interface style;
   detecting that the request corresponds to the component plug-in;
   sending an initial request to the component plug-in;
   receiving, from the component plug-in, an initial model of an initial user interface to provide to the user in response to the initial request;
   building, by the console application, an initial component user interface based on the received initial model wherein the initial component user interface is consistent with the predetermined interface style; and
   displaying the initial component user interface and the console user interface in a common application window wherein both the initial component user interface and the console user interface are displayed in the predetermined interface style.

2. The method of claim 1 further comprising:
   receiving, from the user, one or more values corresponding to one or more input fields included in the displayed console user interface;
   sending the received values to the component plug-in;
   receiving, from the component plug-in, a subsequent model of a subsequent user interface to provide to the user based on the values sent to the component plug-in;
   building, by the console application, a subsequent component user interface based on the received subsequent model wherein the subsequent component user interface is consistent with the predetermined interface style; and
   displaying the subsequent component user interface and the console user interlace in the common application window wherein both the subsequent component user interface and the console user interface are displayed in the predetermined interface style.

3. The method of claim 2 where the receiving of the one or more values, the sending of the received values to the component plug-in, the receiving of the subsequent model, the building of the subsequent component user interface, and the displaying of the subsequent component user interface are performed a plurality of times, the method further comprising:
   receiving, from the component plug-in, a finished response; and
   removing the subsequent component user interface from the common application window in response to receiving the finished response.

4. The method of claim 1 further comprising:
   creating one or more user interface components based on the initial model received from the plug-in; and
   inserting the created user interface components into the console user interface.

5. The method of claim 4 further comprising:
rendering the user interface components into the predetermined interface style using a selected software renderer function.

6. The method of claim 5 further comprising:
prior to receiving the request from the user of the console application:
selecting, by a user, the selected software renderer function from a plurality of renders functions, wherein each of the renderer functions renders components into a different interface style.

7. The method of claim 6 wherein the building of the initial component user interface further comprises:
retrieving a renderer configuration that identifies the user selected software renderer function; and
executing the selected renderer function to render the component user interface components.

8. An information handling system comprising:
one or more processors;
a memory accessible by at least one of the processors;
a nonvolatile storage medium accessible by at least one of the processors;
registering a component plug-in with a console application;
receiving, from a user of the console application, a request, wherein the console application displays a console user interface in a predetermined interface style;
detecting that the request corresponds to the component plug-in;
sending an initial request to the component plug-in;
receiving, from the component plug-in, an initial model of an initial user interface to provide to the user in response to the initial request;
building, by the console application, a subsequent component user interface based on a received subsequent model wherein the subsequent component user interface is consistent with the predetermined interface style; and
displaying the initial component user interface and the console user interface in a common application window wherein both the initial component user interface and the console user interface are displayed in the predetermined interface style.

9. The information handling system of claim 8 wherein the actions further comprise:
receiving, from the user, one or more values corresponding to one or more input fields included in the displayed console user interface;
sending the received values to the component plug-in;
receiving, from the component plug-in, a subsequent model of a subsequent user interface to provide to the user based on the values sent to the component plug-in;
building, by the console application, a subsequent component user interface consistent with the predetermined interface style; and
displaying the subsequent component user interface and the console user interface in the common application window wherein both the subsequent component user interface and the console user interface are displayed in the predetermined interface style.

10. The information handling system of claim 9 where the receiving of the one or more values, the sending of the received values to the component plug-in, the receiving of the subsequent model, the building of the subsequent component user interface, and the displaying of the subsequent component user interface are performed a plurality of times, further include actions comprising:
receiving, from the component plug-in, a finished response; and removing the subsequent component user interface from the common application window in response to receiving the finished response.

11. The information handling system of claim 8 wherein the actions further comprise:
creating one or more user interface components based on the initial model received from the plug-in; and
inserting the created user interface components into the console user interface.

12. The information handling system of claim 11 wherein the actions further comprise:
rendering the user interface components into the predetermined interface style using a selected software renderer function.

13. The information handling system of claim 12 wherein the actions further comprise:
prior to receiving the request from the user of the console application:
selecting, by a user, the selected software renderer function from a plurality of renderer functions, wherein each of the renderer functions renders components into a different interface style.

14. A computer program product stored in a computer readable medium, comprising functional descriptive material that, when executed by an information handling system, causes the information handling system to perform actions comprising:
registering a component plug-in with a console application; receiving, from a user of the console application, a request, wherein the console application displays a console user interface in a predetermined interface style;
detecting that the request corresponds to the component plug-in; sending an initial request to the component plug-in;
receiving, from the component plug-in, an initial model of an initial user interface to provide to the user in response to the initial request;
building, by the console application, an initial component user interface consistent with the predetermined interface style; and
displaying the initial component user interface and the console user interface in a common application window wherein both the initial component user interface and the console user interface are displayed in the predetermined interface style.

15. The computer program product of claim 14 wherein the actions further comprise:
receiving, from the user, one or more values corresponding to one or more input fields included in the displayed console user interface;
sending the received values to the component plug-in;
receiving, from the component plug-in, a subsequent model of a subsequent user interface to provide to the user based on the values sent to the component plug-in;
building, by the console application, a subsequent component user interface based on the received subsequent model wherein the subsequent component user interface is consistent with the predetermined interface style; and
displaying the subsequent component user interface and the console user interface in the common application window wherein both the subsequent component user interface and the console user interface are displayed in the predetermined interface style.

16. The computer program product of claim 15 where the receiving of the one or more values, the sending of the received values to the component plug-in, the receiving of the subsequent model, the building of the subsequent component user interface, and the displaying of the subsequent component user interface are performed a plurality of times, and wherein the actions further comprise:

receiving, from the component plug-in, a finished response; and removing the subsequent component user interface from the common application window in response to receiving the finished response.

17. The computer program product of claim 14 wherein the actions further comprise:

creating one or more user interface components based on the initial model received from the plug-in; and inserting the created user interface components into the console user interface.

18. The computer program product of claim 17 wherein the actions further comprise:

rendering the user interface components into the predetermined interface style using a selected software renderer function.

19. The computer program product of claim 18 wherein the actions further comprise:

prior to receiving the request from the user of the console application:

selecting, by a user, the selected software renderer function from a plurality of renderer functions, wherein each of the renderer functions renders components into a different interface style.

20. The computer program product of claim 19 wherein the building of the initial component user interface further comprises actions of:

retrieving a renderer configuration that identifies the user selected software renderer function; and executing the selected renderer function to render the component user interface components.

* * * * *